United States Patent
Tseng et al.

(10) Patent No.: US 12,493,064 B2
(45) Date of Patent: Dec. 9, 2025

(54) METHOD AND SYSTEM FOR IDENTIFYING OPERATING STATUS OF ELECTRICAL APPLIANCE BASED ON NON-INTRUSIVE LOAD MONITORING

(71) Applicant: INSTITUTE FOR INFORMATION INDUSTRY, Taipei (TW)

(72) Inventors: Kuang-Ping Tseng, Taipei (TW);
Wen-Jen Ho, Taipei (TW);
Yung-Chieh Hung, Taipei (TW);
Kuei-Chun Chiang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 597 days.

(21) Appl. No.: 17/974,494

(22) Filed: Oct. 26, 2022

(65) Prior Publication Data
US 2024/0085465 A1 Mar. 14, 2024

(30) Foreign Application Priority Data
Sep. 14, 2022 (TW) .................................. 111134648

(51) Int. Cl.
*G01R 22/06* (2006.01)
(52) U.S. Cl.
CPC .................... *G01R 22/06* (2013.01)
(58) Field of Classification Search
CPC .............................. G01R 22/06; G01R 21/133
See application file for complete search history.

(56) References Cited

U.S. PATENT DOCUMENTS

| | | | |
|---|---|---|---|
| 10,120,004 B1 | 11/2018 | Tsai et al. | |
| 12,135,344 B2* | 11/2024 | Min | G06N 7/01 |
| 2018/0259571 A1* | 9/2018 | Castelli | G01R 31/2825 |
| 2021/0123771 A1* | 4/2021 | Vega | H04Q 9/00 |
| 2022/0050130 A1* | 2/2022 | Song | G01R 19/2513 |

FOREIGN PATENT DOCUMENTS

| | | |
|---|---|---|
| CN | 106815667 A | 6/2017 |
| TW | 201917671 A | 5/2019 |

* cited by examiner

*Primary Examiner* — Ricky Go
(74) *Attorney, Agent, or Firm* — Li & Cai Intellectual Property Office

(57) ABSTRACT

A method and a system for identifying an operating status of an electrical appliance based on non-intrusive load monitoring are provided. The method includes the following steps. Total power consumption history data of a target field and appliance power consumption history data of target electrical appliances are obtained. The appliance power consumption history data of each target electrical appliance is converted into a binary data set. The total power consumption history data is clustered into cluster samples to obtain first feature data sets, which are then dimensionally reduced into second feature data sets, and a machine learning model is trained by using the second feature data sets and the binary data sets of the target electrical appliances to establish an operation identification model for the target electrical appliances. The operation identification model identifies an operating status of the target electrical appliances according to total power consumption data.

16 Claims, 4 Drawing Sheets

METHOD AND SYSTEM FOR IDENTIFYING OPERATING STATUS OF ELECTRICAL APPLIANCE BASED ON NON-INTRUSIVE LOAD MONITORING

CROSS-REFERENCE TO RELATED PATENT APPLICATION

This application claims the benefit of priority to Taiwan Patent Application No. 111134648, filed on Sep. 14, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and a system for identifying an operating status of an electrical appliance, and more particularly to a method and a system for identifying an operating status of an electrical appliance based on non-intrusive load monitoring (NILM).

BACKGROUND OF THE DISCLOSURE

Non-intrusive load monitoring is an electricity monitoring technique capable of identifying operating statuses of every electrical appliance in a target field (e.g., a residence) by analyzing total power consumption data that exemplarily includes multiple records of total power consumptions collected by an electricity meter over a period of time. However, the conventional method for identifying the operating status of electrical appliances based on the non-intrusive load monitoring requires the electricity meter to obtain the total power consumption of the target field according to a high frequency sampling rate (usually greater than 1 Hz), and then the power consumption features of each target electrical appliance are manually labeled from the total power consumption history data. Therefore, not only may the conventional method involve extremely complex procedures, but most smart meters do not have the capability of obtaining the power consumption at such a high-frequency sampling rate.

SUMMARY OF THE DISCLOSURE

In response to the above-referenced technical inadequacies, the present disclosure provides a method and a system for identifying an operating status of an electrical appliance based on non-intrusive load monitoring. In one aspect, the present disclosure provides a method for identifying an operating status of an electrical appliance based on non-intrusive load monitoring, and the method is applicable to a system that includes a database and a server. The server is coupled to the database, and the server includes a memory and a processing circuit that executes a plurality of instructions obtained from the memory. The method is performed by the processing circuit and includes the following steps: executing a data reading process to obtain total power consumption history data of a target field and appliance power consumption history data of a plurality of target electrical appliances in the target field, in which the total power consumption history data of each of the target electrical appliances includes a plurality of total power consumptions obtained by an electricity meter according to a first sampling frequency, in which, for each of the target electrical appliances, the corresponding appliance power consumption history data includes a plurality of appliance power consumptions obtained from the target electrical appliance by the electricity meter according to the first sampling frequency, and the first sampling frequency is less than or equal to a standard sampling frequency; executing a labeling process to convert the appliance power consumption history data of each of the target electrical appliances into a binary data set for describing whether an operating status of the corresponding target electrical appliance is ON or OFF; executing a feature extraction process to cluster the total power consumption history data into a plurality of cluster samples, and analyzing the plurality of cluster samples to correspondingly obtain a plurality of first feature data sets, in which each of the plurality of cluster samples includes a subset of the total power consumptions, and each of the plurality of first feature data sets includes a plurality of statistical feature values; executing a feature filtering process to filter the statistical feature values, so as to dimensionally reduce the plurality of first feature data sets into a plurality of second feature data sets, and executing a model building process to train a machine learning model by using the second feature data sets and the binary data sets of the target electrical appliances as training data, so as to establish an operation identification model for the plurality of target electrical appliances; and using the operation identification model to identify the operating status of each of the target electrical appliances according to total power consumption data of the target field.

In another aspect, the present disclosure provides a system for identifying an operating status of an electrical appliance based on non-intrusive load monitoring. The system is coupled to a plurality of target electrical appliances disposed in a target field, and the system includes a database and a server. The database is configured to store total power consumption history data of a target field and appliance power consumption history data of a plurality of target electrical appliances in the target field. The total power consumption history data of each of the target electrical appliances includes a plurality of total power consumptions obtained by an electricity meter according to a first sampling frequency, and for each of the target electrical appliances, the corresponding appliance power consumption history data includes a plurality of appliance power consumptions obtained from the target electrical appliance by the electricity meter according to the first sampling frequency, and the first sampling frequency is less than or equal to a standard sampling frequency. The server is coupled to the database and includes a memory and a processing circuit coupled to the memory. The memory is configured to store a plurality of instructions. The processing circuit is configured to obtain the plurality of instructions from the memory and execute the instructions to perform: executing a data reading process to obtain the total power consumption history data and the appliance power consumption historical data of the plurality of target electrical appliances; executing a labeling process to convert the appliance power consumption history data of each of the target electrical appliances into a binary data set for describing whether an operating status of the corresponding target electrical appliance is ON or OFF; executing a feature extraction process to cluster the total power consumption history data into a plurality of cluster samples, and analyzing the plurality of cluster samples to correspondingly obtain a plurality of first feature data sets, in which each of the plurality of cluster samples includes a subset of the total power consumptions, and each of the plurality of first feature data sets includes a plurality of statistical feature values; executing a feature filtering process to filter the statistical feature values, so as to dimensionally reduce the plurality of first feature data sets into a plurality of second feature data sets, and executing a model building process to train a machine learning model by using the second feature data sets and the binary data sets of the target electrical appliances as training data, so as to establish an operation identification model for the plurality of target electrical appliances; and using the operation identification model to identify the operating status of each of the target electrical appliances according to total power consumption data of the target field.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
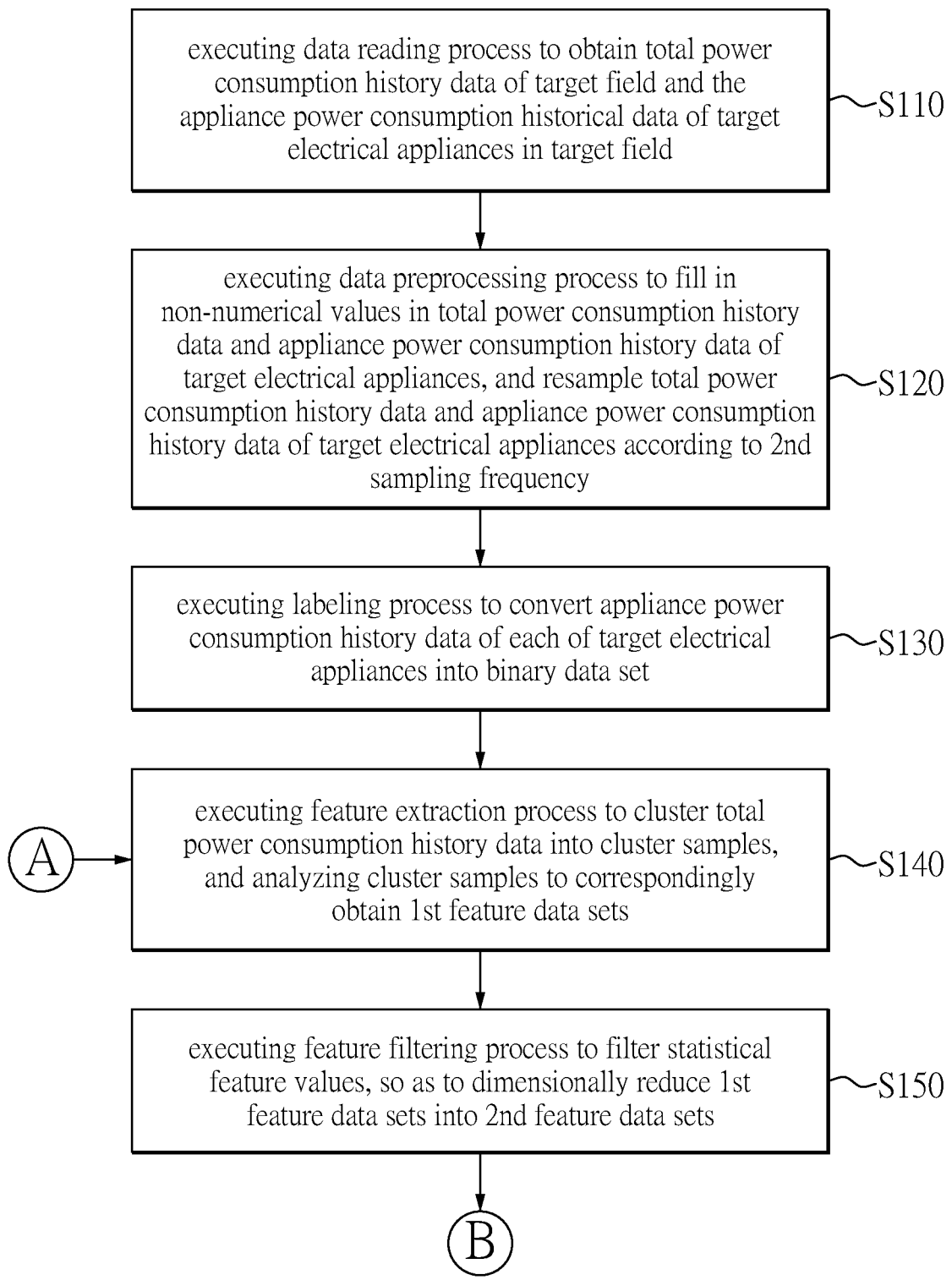
FIGS. 1A and 1B are flowcharts of a method for identifying an operating status of an electrical appliance based on non-intrusive load monitoring according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1B:
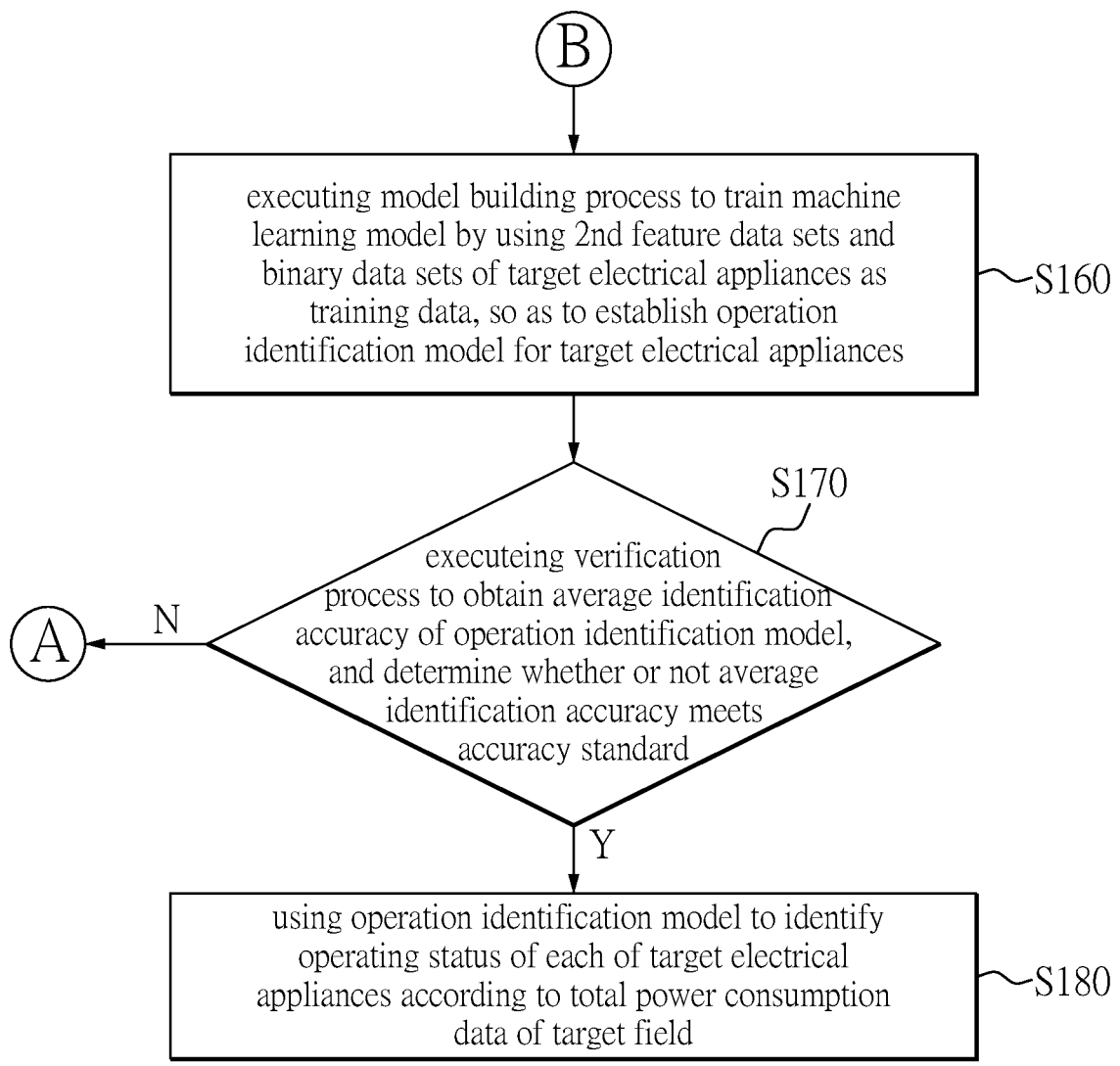

Reference is made to FIGS. 1A and 1B, which are flowcharts of a method for identifying an operating status of an electrical appliance based on non-intrusive load monitoring according to one embodiment of the present disclosure. The method of the present embodiment mainly combines feature engineering and machine learning to achieve identification of an operating status of an electrical appliance at a low frequency sampling rate. It should be noted that the method of the present embodiment is applicable to a system including a database and a server. The server is coupled to the database, and the server includes a memory and a processing circuit that executes a plurality of instructions obtained from the memory, but the present disclosure does not limit specific implementations of the memory and the processing circuit. The method of the present embodiment is executed by the processing circuit of the server, and the method includes steps shown in FIGS. 1A and 1B.

As shown in FIGS. 1A and 1B, in step S110, the processing circuit of the server executes a data reading process to obtain total power consumption history data of a target field (such as a residence) and the appliance power consumption historical data of a plurality of target electrical appliances in the target field. The total power consumption history data includes a plurality of total power consumptions obtained by an electricity meter (e.g., a smart meter) according to a first sampling frequency. For each of the target electrical appliances, the corresponding appliance power consumption history data includes a plurality of appliance power consumptions obtained from the target electrical appliance by the electricity meter according to the first sampling frequency.

For the convenience of the following description, each total power consumption in the present embodiment can be, for example, a total wattage, and each electrical appliance power consumption may be, for example, an appliance wattage, but the present disclosure is not limited thereto. In addition, the high-frequency sampling rate can be defined as a sampling frequency greater than a standard sampling frequency (e.g., 1/60 Hz), and the power consumption data obtained by the electricity meter according to the high-frequency sampling rate can be defined as high-frequency power consumption data. In contrast, the low-frequency sampling rate is defined as a sampling frequency less than or equal to the standard sampling frequency, and the power consumption data obtained by the electricity meter according to the low-frequency sampling rate can be defined as low-frequency power consumption data.

Since most smart meters do not have capabilities to obtain power consumptions according to the high-frequency sampling rate, the first sampling frequency in the present embodiment is set to less than or equal to the above-mentioned standard sampling frequency. For example, the first sampling frequency is 1/60 Hz, that is, sampling for one time in one minute. For example, in the present embodiment, the electricity meter can be configured to sample the total wattage of the target field and the appliance wattage of each target appliance in the target field every one minute, and multiple records of the total power consumption wattage and multiple records of the appliance wattage of each target appliance collected by the electricity meter over a period of time is then taken as the total power consumption history data and the appliance power consumption history data of each target electrical appliance. That is, actual low-frequency power consumption data of a residence can be utilized by the method of the present embodiment.

Furthermore, the total power consumption history data and the appliance power consumption history data of the target electrical appliances are collected by the electricity meter and stored in the database, and the data reading process can include configuring the processing circuit of the server to read the total power consumption history data and the appliance power consumption history data of each of the target electrical appliances from the database. Next, in step S130, the processing circuit of the server is configured to execute a labeling process to convert the appliance power consumption history data of each of the target electrical appliances into a binary data set for describing whether an operating status of the corresponding target electrical appliance is ON or OFF. For each of the target electrical appliances, the corresponding one of the binary data sets includes a plurality of data elements that correspond to the power consumptions of the target electrical appliance, and each of the data elements is a first value or a second value (e.g., 1 or 0), and the first value and the second value are used to indicate that the operating status of the target electrical appliance is ON and OFF, respectively. In other words, in the present embodiment, the processing circuit of the server can be configured to perform a binary classification on each appliance power consumption in the appliance power consumption history data, so as to directly describe that the operating status of the corresponding target electrical appliance is ON or OFF.

Figure 2:
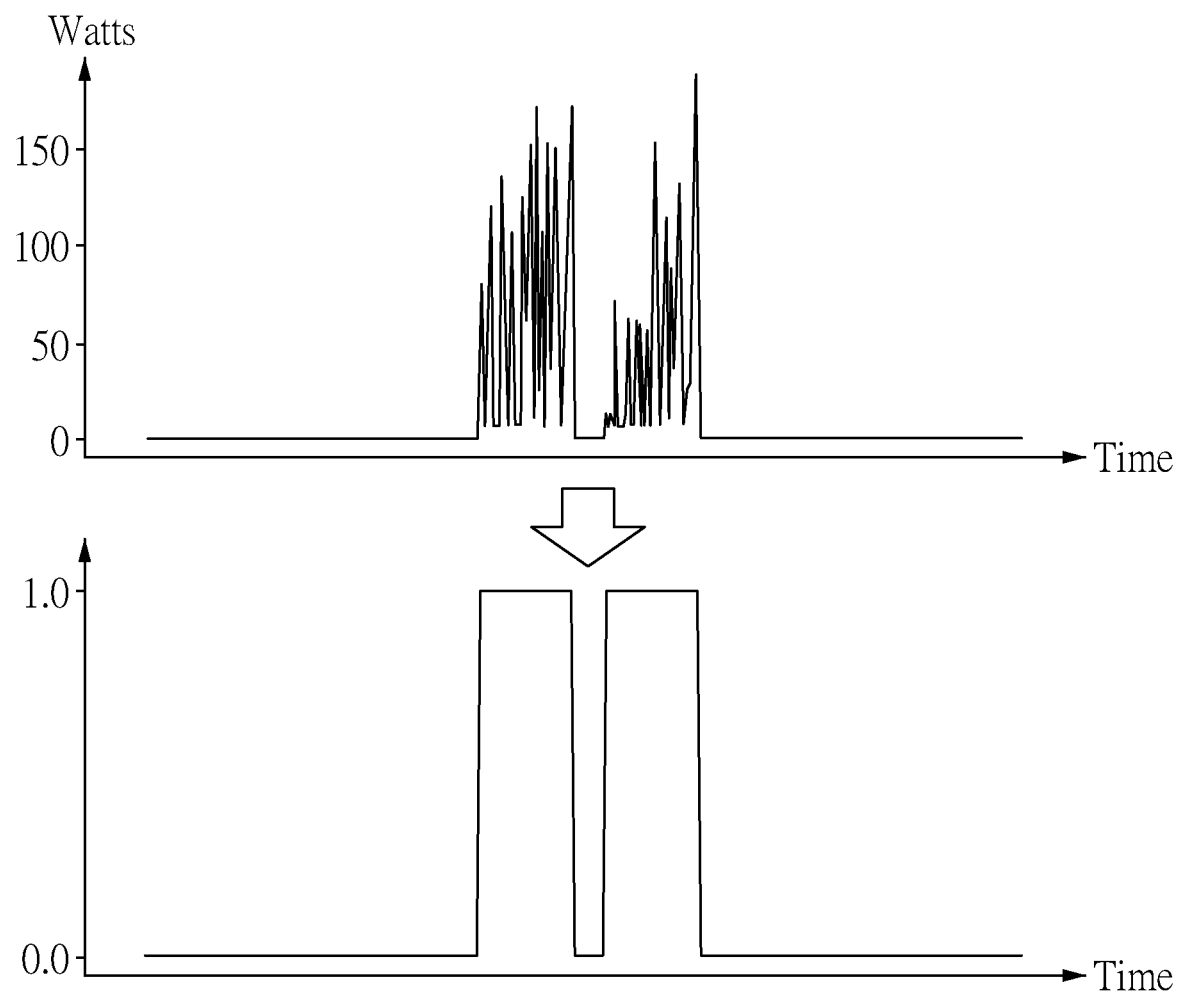
FIG. 2 is a schematic diagram showing appliance power consumption history data of a target electrical appliance being converted into a binary data set according to one embodiment of the present disclosure.

Specifically, the processing circuit of the server can be configured to determine that the operating status of the target electrical appliance is ON or OFF according to the power consumption of the electrical appliance. For example, when certain appliance power consumption in the power consumption history data of one of the target electrical appliances is greater than 0 watts, the processing circuit of the server can be configured to determine that the operating status of the target electrical appliance is ON, and a data element in the binary data set corresponding to the appliance power consumption is 1. On the other hand, when certain appliance power consumption in the power consumption history data of one of the target electrical appliances is 0 watts, the processing circuit of the server can be configured to determine that the operating status of the target electrical appliance is OFF, and a data element in the binary data set corresponding to the appliance power consumption is 0. Reference is further made to FIG. 2, which is a schematic diagram showing appliance power consumption history data of a target electrical appliance being converted into a binary data set according to one embodiment of the present disclosure.

It should be understood that the appliance power consumptions in the appliance power consumption history data of each target electrical appliance corresponds to a plurality of sampling times, respectively, and for the convenience of understanding, the appliance power consumption history data is represented by plotting a waveform of watts of appliance power consumption appliance according to the sampling time, and therefore, the binary data set of the target electrical appliance after the labeling process being performed can be illustrated in a waveform with square waves.

Next, in step S140, the processing circuit of the server executes a feature extraction process to cluster the total power consumption history data into a plurality of cluster samples, and to analyze the plurality of cluster samples to correspondingly obtain a plurality of first feature data sets. In the present embodiment, each of the plurality of cluster samples includes a subset of the total power consumptions, that is, each cluster sample includes several total power consumptions that are a part of the total power consumption history data, and each of the plurality of first feature data sets includes a plurality of statistical feature values.

It should be noted that the total power consumptions of the total power consumption history data also correspond to the plurality of sampling times, respectively. Therefore, the feature extraction process can include clustering the total power consumption history data into the plurality of cluster samples according to the sampling times and a unit time. In this embodiment, the unit time can be 1 hour, but the present disclosure is not limited thereto. That is to say, the processing circuit of the server can be configured to take the plurality of total power consumptions collected by the electricity meter in one hour as one cluster sample. In addition, the step of analyzing the cluster samples can includes obtaining the statistical feature values of the plurality of first feature data sets by using a statistical formula or a signal processing method for the total power consumptions of the cluster samples. For example, the processing circuit of the server can be configured to take 60 records of the total power consumptions collected by the electricity meter in one hour as one cluster sample, and to use statistical formulas or signal processing methods for these 60 records of the total power consumptions to obtain a plurality of statistical feature values.

Each first feature data set of the present embodiment can include statistical feature values such as mean values, standard deviations, maximum values, minimum values, 5th percentiles, 95th percentiles, root mean squares, peak-to-peak factors, crest factors, skewness coefficients, kurtosis coefficient, form factors and period factors, but the present disclosure is not limited thereto. Since overfitting may easily occur when training a machine learning model with too many statistical feature values, in step S150 following step S140, the processing circuit of the server can be configured to execute a feature filtering process to filter the statistical feature values, so as to dimensionally reduce the plurality of first feature data sets into a plurality of second feature data sets. In other words, to find out the more important statistical feature values in the first feature data set, the processing circuit of the server executes the feature screening process, so as to prevent overfitting by using lesser statistical feature values in the training of the machine learning model, and to improve an accuracy of the machine learning model.

Specifically, the processing circuit of the server can be configured to filter the statistical feature values by using a Lasso algorithm, that is, to filter out unimportant statistical feature values, so as to dimensionally reduce the plurality of first feature data sets into the plurality of second feature data sets. Lasso algorithm is a linear regression method that uses L1-regularization. Using L1-regularization will make feature weights learned by certain regressions become 0, so as to achieve sparsification and feature selection. The sparsification can make the server operate faster to obtain the optimal solution, and the operation that turns the feature weights into 0 can be used for the feature (variable) selection. Therefore, Lasso algorithm performs both variable selection and regularization while fitting a generalized linear model, also known as a complexity adjustment. For example, the processing circuit of the server can use the L1-regularization of Lasso algorithm to perform regression learning on the first feature data sets of the total power consumption history data and the binary data set of each target appliance, so as to turn weights of the unimportant statistical feature values into 0. In other words, if some statistical feature values are unimportant, Lasso algorithm penalizes those statistical feature values by turning them into 0, such that the server can filter out those unimportant statistical feature values, and the rest of the statistical feature values are included in the second feature data sets.

In the present embodiment, the processing circuit of the server can use Lasso algorithm to dimensionally reduce each first feature data set including the above 13 statistical feature values to the second feature data set including only 10 statistical feature values, but the present disclosure is not limited thereto. Next, in step S160, the processing circuit of the server executes a model building process to train a machine learning model by using the second feature data sets and the binary data sets of the target electrical appliances as training data, so as to establish an operation identification model for the plurality of target electrical appliances. Specifically, in the present embodiment, in order to ensure randomness and diversity of learning results of the machine learning model, an extra tree model can be utilized. The extra tree model randomly selects one or more of the statistical feature values in the second feature data set and the binary data set of any one of the target electrical appliances as an input, thereby generating an identification result corresponding to ON and OFF status of the target electrical appliance. Finally, an accuracy percentage of the identification result of the extra tree model is collected and counted. If the percentage of the identification result is greater than a preset acceptable accuracy percentage, the processing circuit of the server executes the model building process to establish the operation identification model for the target electrical appliances by using the second feature data sets and the binary data set of each target electrical appliance.

For example, the processing circuit can be configured to establish 100 of extra decision trees to form the extra tree model, each of the extra decision trees selects the binary data set of the same target electrical appliance as samples to be inputted, and at least one or more of 10 statistical feature values of the second feature data set obtained in step S150 are randomly inputted. Then, each decision tree generates an identification result of determining that the operating status of the corresponding target electrical appliance is ON or OFF, and a final analysis output of each sample depends on majority results of the 100 decision trees (e.g., if more than 51 trees determines that the operating status of the target appliance is OFF, an inference result of the corresponding sample is OFF). Finally, an accuracy of the trained extra tree model is calculated according to a verification data set (i.e., the appliance power consumption history data of the target electrical appliances). For example, a preset acceptable accuracy percentage can be set to 80%. If the accuracy of the extra tree model is greater than 80%, the identification result is acceptable, then the second feature data set and the binary data set of the target electrical appliances are used to establish the operation identification models for the target electrical appliances.

In step S180, the processing circuit of the server can be configured to use the operation identification model to identify the operating status of each of the target electrical appliances according to total power consumption data of the target field. For example, when a plurality of total power consumption wattages collected by the electric meter in another period of time are input into the operation identification model as the total power consumption data, the operation identification model can identify the operating status of each target electrical appliance.

However, due to unavoidable occurrence of missing values in the collected data, that is, the total electricity consumption history data and the electrical energy consumption history data of each target appliance may have power consumptions that are "not a number (NaN)" values, which may affect the training of the machine learning model. Therefore, the method of the present embodiment can proceed to step S120 before proceeding to step S130. In step S120, the processing circuit of the server can be configured to execute a data preprocessing process to fill in non-numerical values in the total power consumption history data and the appliance power consumption history data of the plurality of target electrical appliances.

Furthermore, if the total power consumption of the target field in a certain period of a certain day is an NaN value, the processing circuit of the server can fill in the NaN value by referring to the total power consumption of the target field in the same period of the other days of the month, but the present disclosure does not limit specific implementations of filling in the NaN value. In addition, after certain NaN values are filled in, the processing circuit of the server can be further configured to remove the total power consumption that may still be the NaN value, so as to avoid affecting the training of the machine learning model, but the present disclosure is not limited thereto.

However, although the training of the machine learning model for establish the operation identification model of the target electrical appliance requires a large amount of historical data support, too large amount of the historical data may cause a burden on the training. Therefore, in the data preprocessing process, the processing circuit can be further configured to resample the total power consumption history data and the appliance power consumption history data of the target electrical appliances according to a second sampling frequency that is less than the first sampling frequency (e.g., 1/900 Hz, i.e., 15 minutes), so as to update the total power consumption and the appliance power consumptions of the plurality of target electrical appliances. In other words, the resampling is utilized to reduce the data amount of the total power consumption and the appliance power consumptions, so as to reduce the burden of the training.

In other embodiments, the processing circuit of the server can further organize, filter and/or divide the total power consumption historical data and the appliance power consumption history data of each target electrical appliance, so as to reduce the data amount of the total power consumption and the appliance power consumptions. Therefore, the above-mentioned resampling according to the second sampling frequency is merely one implementation for reducing the data amount of the history data, but the present disclosure is not limited thereto. Therefore, in a case that there is no missing value in the history data and a reduction of the data amount of the historical data is not considered, step S120 can be omitted in the method of the present embodiment.

It should also be understood that an identification accuracy of the operation identification model may be affected by the statistical feature values. Therefore, to improve the identification accuracy of the operation identification model, the method of this embodiment can further proceed to step S170 before proceeding to step S180. In step S170, the processing circuit of the server executes a verification process to obtain an average identification accuracy of the operation identification model, and determine whether or not the average identification accuracy meets an accuracy standard. If the determination is affirmative, it means that the currently established operation identification model has an excellent identification accuracy, and thus the method can proceed to step S180, the operation identification model is used to identify the operating status of each of the target electrical appliances according to total power consumption data of the target field. If the determination is negative, it means that the identification accuracy of the currently established operation identification model is not good enough, the method can return to step S140.

In other words, in response to determining that the average identification accuracy does not meet the accuracy standard, the method of the present embodiment returns to the step of executing the feature extraction process to obtain the first feature data sets, that is, the operation identification model can be optimized by dynamically adjusting parameters. In practice, in response to the average identification accuracy being not able to meet the accuracy standard, the method can return to the step of executing the feature filtering process, such that the processing circuit of the server can reduce or increase the number of statistical feature values that are filtered out by adjusting parameters of Lasso algorithm, thereby optimizing the operation identification model by dynamically adjusting the parameters. In addition, in this embodiment, a validation set can be obtained from the history data, and the validation set can be used to obtain the average identification accuracy of the operation identification model. Since validating the trained machine learning model by using the validation set is known to those skilled in the art, related details are omitted hereinafter. Similarly, in a case that the optimization of the operation identification model is not considered, step S120 can be omitted in the method of the present embodiment.

Figure 3:
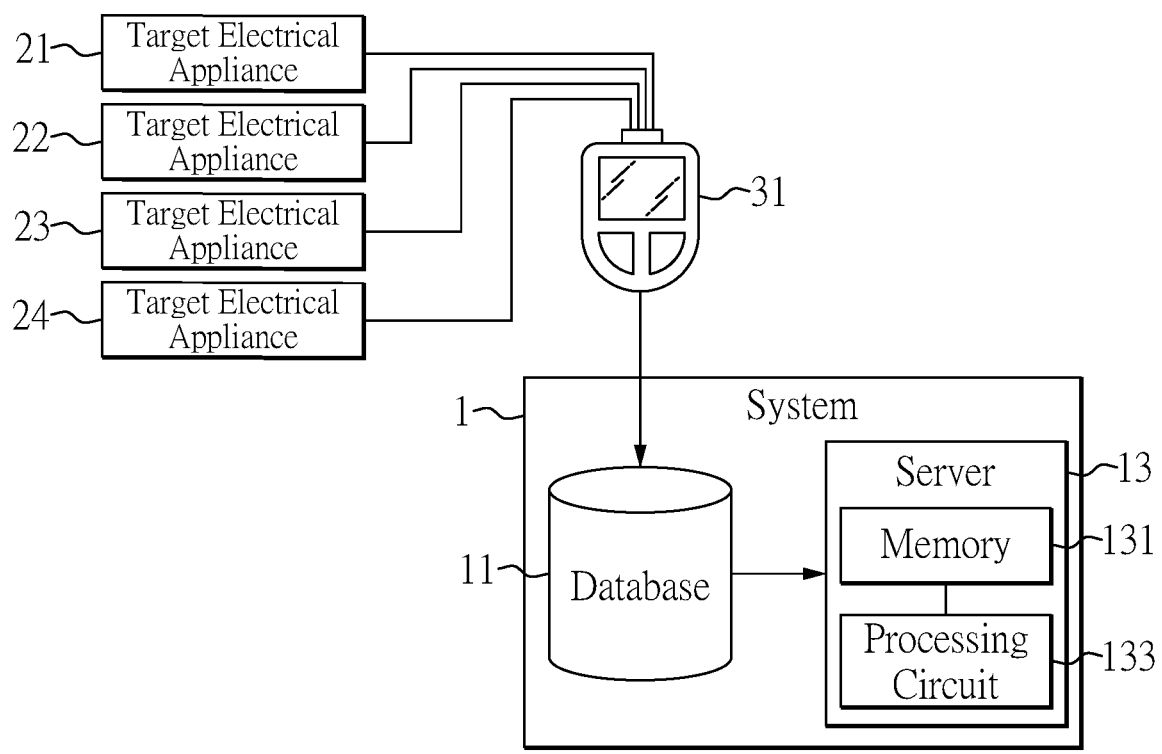
FIG. 3 is a functional block diagram of a system for identifying an operating status of an electrical appliance based on non-intrusive load monitoring according to one embodiment of the present disclosure.

Reference is made to FIG. 3, which is a functional block diagram of a system for identifying an operating status of an electrical appliance based on non-intrusive load monitoring according to one embodiment of the present disclosure. As shown in FIG. 3, a system 1 of the present embodiment is coupled to a plurality of target electrical appliances 21, 22, 23 and 24 that are disposed in a target field, and the system includes a database 11 and a server 13. The database 11 is configured to store total power consumption history data of the target field and appliance power consumption history data of the target electrical appliances 21, 22, 23 and 24. It should to noted that, for the convenience of the following description, the system 1 in FIG. 3 that is merely coupled to four target electrical appliances is taken as an example, but the present disclosure does not limit the specific number of the target electrical appliances coupled to the system 1. In addition, the system 1 can be coupled to the target electrical appliances 21, 22, 23 and 24 through the electricity meter 31.

In this embodiment, the total power consumption history data includes a plurality of total power consumptions obtained by the electricity meter 31 according to a first sampling frequency. For each of the target electrical appliances, the corresponding appliance power consumption history data includes a plurality of appliance power consumptions obtained from the target electrical appliance by the electricity meter 31 according to the first sampling frequency. For example, the appliance power consumption history data of the target electrical appliance 21 includes a plurality of appliance power consumptions of the target electrical appliance 21 obtained by the electricity meter 31 according to the first sampling frequency, and so forth, the appliance power consumption history data of the target electrical appliance 24 includes a plurality of appliance power consumptions of the target electrical appliance 24 obtained by the electricity meter 31 according to the first sampling frequency. As mentioned above, since most smart meters do not have capabilities to obtain power consumptions according to the high-frequency sampling rate, the first sampling frequency in the present embodiment is set to less than or equal to the above-mentioned standard sampling frequency.

Furthermore, the total power consumption history data and the appliance power consumption history data of the target electrical appliances are collected by the electricity meter and stored in the database 11 of the system 1. The server 13 is coupled to the database 11 and includes a memory 131 and a processing circuit 133 coupled to the memory 131. The memory 131 and the processing circuit 133 can be implemented by hardware in combination with software and/or firmware, but the present disclosure does not limit specific implementations of the memory 131 and the processing circuit 133. The memory 131 is configured to store a plurality of instructions. The processing circuit 133 can, for example, include one or more processors configured to obtain the instructions from memory 131 and execute the instructions to perform the steps of FIGS. 1A and 1B. In other words, the processing circuit 133 can be configured to perform the aforementioned method of identifying the operating status of the electrical appliance based on the non-intrusive load monitoring. Since the details are the same as the above-mentioned embodiments, they will not be repeated here.

In conclusion, in the method and the system for identifying the operating status of the electrical appliance based on the non-intrusive load monitoring provided by present disclosure, since power consumption behaviors of different electrical appliances can be analyzed, the operation identification model established by the present disclosure can be expected to provide customized power consumption adjustment suggestions, and the non-intrusive load monitoring can be applied in novel ways. In addition, in the method and the system for identifying the operating status of the electrical appliance based on the non-intrusive load monitoring provided by present disclosure, the operating status of the electrical appliances can be identified at a low frequency sampling rate, so as to provide tolerance for the non-intrusive load monitoring in complex environments.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for identifying an operating status of an electrical appliance based on non-intrusive load monitoring, applicable to a system including a database and a server coupled to the database, the server including a memory and a processing circuit that executes a plurality of instructions obtained from the memory, and the method being performed by the processing circuit and comprising the following steps:

executing a data reading process to obtain total power consumption history data of a target field and appliance power consumption history data of a plurality of target electrical appliances in the target field, wherein the total power consumption history data of each of the target electrical appliances includes a plurality of total power consumptions obtained by an electricity meter according to a first sampling frequency, wherein, for each of the target electrical appliances, the corresponding appliance power consumption history data includes a plurality of appliance power consumptions obtained from the target electrical appliance by the electricity meter according to the first sampling frequency, and the first sampling frequency is less than or equal to a standard sampling frequency;

executing a labeling process to convert the appliance power consumption history data of each of the target electrical appliances into a binary data set for describing whether an operating status of the corresponding target electrical appliance is ON or OFF;

executing a feature extraction process to cluster the total power consumption history data into a plurality of cluster samples, and analyzing the plurality of cluster samples to correspondingly obtain a plurality of first feature data sets, wherein each of the plurality of cluster samples includes a subset of the total power consumptions, and each of the plurality of first feature data sets includes a plurality of statistical feature values;

executing a feature filtering process to filter the statistical feature values, so as to dimensionally reduce the plurality of first feature data sets into a plurality of second feature data sets, and executing a model building process to train a machine learning model by using the second feature data sets and the electrical appliances of the target electrical appliances as training data, so as to establish an operation identification model for the plurality of target electrical appliances; and using the operation identification model to identify the operating status of each of the target electrical appliances according to total power consumption data of the target field;

wherein, before executing the labeling process, the method further comprises:

executing a data preprocessing process to fill in non-numerical values in the total power consumption history data and the appliance power consumption history data of the plurality of target electrical appliances;

wherein, the data preprocessing process further includes:

re-sampling the total power consumption history data and the appliance power consumption history data of the target electrical appliances according to a second sampling frequency that is less than the first sampling frequency, so as to update the total power consumption and the appliance power consumptions of the plurality of target electrical appliances.

2. The method according to claim 1, wherein, for each of the target electrical appliances, the corresponding one of the binary data sets includes a plurality of data elements that correspond to the power consumptions of the target electrical appliance, and each of the data elements is a first value or a second value, and the first value and the second value are used to indicate that the operating status of the target electrical appliance is ON and OFF, respectively.

3. The method according to claim 1, wherein the total power consumption history data and the appliance power consumption history data of the plurality of target electrical appliances are collected by the electricity meter and stored in a database, and the data reading process further includes: configuring the processing circuit of the server to read the total power consumption history data and the appliance power consumption history data of each of the target electrical appliances from the database.

4. The method according to claim 1, wherein the total power consumptions correspond to a plurality of sampling times, respectively, and the feature extraction process further includes: clustering the total power consumption history data into the plurality of cluster samples according to the sampling times and a unit time.

5. The method according to claim 4, wherein the unit time is 1 hour, and the step of analyzing the cluster samples includes: obtaining the statistical feature values of the plurality of first feature data sets by using a statistical formula or a signal processing method for the total power consumptions of the cluster samples.

6. The method according to claim 1, wherein the feature filtering process includes: filtering the statistical feature values by using a Lasso algorithm, so as to dimensionally reduce the plurality of first feature data sets into the plurality of second feature data sets.

7. The method according to claim 1, wherein the machine learning model is an extra tree model.

8. The method according to claim 1, wherein, before using the operation identification model to identify the operating status of each of the target electrical appliances, the method further comprises:

executing a verification process to obtain an average identification accuracy of the operation identification model, and determine whether or not the average identification accuracy meets an accuracy standard; and in response to determining that the average identification accuracy does not meet the accuracy standard, returning to the step of executing the feature extraction process to obtain the first feature data sets.

9. A system for identifying an operating status of an electrical appliance based on non-intrusive load monitoring, the system being coupled to a plurality of target electrical appliances disposed in a target field, and the system comprising:

a database configured to store total power consumption history data of a target field and appliance power consumption history data of a plurality of target electrical appliances in the target field, wherein the total power consumption history data of each of the target electrical appliances includes a plurality of total power consumptions obtained by an electricity meter according to a first sampling frequency, wherein, for each of the target electrical appliances, the corresponding appliance power consumption history data includes a plurality of appliance power consumptions obtained from the target electrical appliance by the electricity meter according to the first sampling frequency, and the first sampling frequency is less than or equal to a standard sampling frequency;

a server coupled to the database, wherein the server includes:

a memory configured to store a plurality of instructions; and a processing circuit coupled to the memory, wherein the processing circuit is configured to obtain the plurality of instructions from the memory and execute the instructions to perform:

executing a data reading process to obtain the total power consumption history data and the appliance power consumption historical data of the plurality of target electrical appliances;

executing a labeling process to convert the appliance power consumption history data of each of the target electrical appliances into a binary data set for describing whether an operating status of the corresponding target electrical appliance is ON or OFF;

executing a feature extraction process to cluster the total power consumption history data into a plurality of cluster samples, and analyzing the plurality of cluster samples to correspondingly obtain a plurality of first feature data sets, wherein each of the plurality of cluster samples includes a subset of the total power consumptions, and each of the plurality of first feature data sets includes a plurality of statistical feature values;

executing a feature filtering process to filter the statistical feature values, so as to dimensionally reduce the plurality of first feature data sets into a plurality of second feature data sets, and executing a model building process to train a machine learning model by using the second feature data sets and the binary data sets of the target electrical appliances as training data, so as to establish an operation identification model for the plurality of target electrical appliances; and using the operation identification model to identify the operating status of each of the target electrical appliances according to total power consumption data of the target field;

wherein the processing circuit is further configured to perform, before executing the labeling process:

executing a data preprocessing process to fill in non-numerical values in the total power consumption history data and the appliance power consumption history data of the plurality of target electrical appliances;

wherein, in the data preprocessing process, the processing circuit is further configured to perform:

re-sampling the total power consumption history data and the appliance power consumption history data of the target electrical appliances according to a second sampling frequency that is less than the first sampling frequency, so as to update the total power consumption and the appliance power consumptions of the plurality of target electrical appliances.

10. The system according to claim 9, wherein, for each of the target electrical appliances, the corresponding one of the binary data sets includes a plurality of data elements that correspond to the power consumptions of the target electrical appliance, and each of the data elements is a first value or a second value, and the first value and the second value are used to indicate that the operating status of the target electrical appliance is ON and OFF, respectively.

11. The system according to claim 9, wherein the total power consumption history data and the appliance power consumption history data of the plurality of target electrical appliances are collected by the electricity meter and stored in a database, and in the data reading process, the processing circuit of the server is configured to read the total power consumption history data and the appliance power consumption history data of each of the target electrical appliances from the database.

12. The system according to claim 9, wherein the total power consumptions correspond to a plurality of sampling times, respectively, and the feature extraction process further includes: clustering the total power consumption history data into the plurality of cluster samples according to the sampling times and a unit time.

13. The system according to claim 12, wherein the unit time is 1 hour, and in the step of analyzing the cluster samples, the processing circuit is further configured to perform: obtaining the statistical feature values of the plurality of first feature data sets by using a statistical formula or a signal processing method for the total power consumptions of the cluster samples.

14. The system according to claim 9, wherein, in the feature filtering process, the processing circuit is further configured to perform: filtering the statistical feature values by using a Lasso algorithm, so as to dimensionally reduce the plurality of first feature data sets into the plurality of second feature data sets.

15. The system according to claim 9, wherein the machine learning model is an extra tree model.

16. The system according to claim 9, wherein, before performing the step of using the operation identification model to identify the operating status of each of the target electrical appliances, the processing circuit is further configured to perform:

executing a verification process to obtain an average identification accuracy of the operation identification model, and determine whether or not the average identification accuracy meets an accuracy standard; and in response to determining that the average identification accuracy does not meet the accuracy standard, returning to the step of executing the feature extraction process to obtain the first feature data sets.

* * * * *